United States Patent [19]

Cook et al.

[11] 4,407,686

[45] Oct. 4, 1983

[54] INFLATABLE DEVICE FOR INSTALLING STRAIN GAGE BRIDGES

[75] Inventors: Clarence E. Cook, Lancaster; Glynn E. Smith, Quartz Hill; Richard C. Monaghan, Pearblossom, all of Calif.

[73] Assignee: The United States of America as represented by the Administrator of the National Aeronautics and Space Administration, Washington, D.C.

[21] Appl. No.: 322,314

[22] Filed: Nov. 17, 1981

[51] Int. Cl.³ .................. E04B 2/00; E04F 13/00; B44C 1/00; G01L 1/22
[52] U.S. Cl. ...................... 156/215; 156/71; 156/230; 156/235; 156/294; 156/391; 156/423; 156/540; 338/2
[58] Field of Search .............. 156/294, 293, 215, 213, 156/391, 235, 71, 230, 165, 287, 423, 303.1, 493, 540, 156, 249, 187, 541; 73/720, 721, 726, 727, 708; 338/4, 5, 6, 42, 39, 36, 2; 228/179, 60, 903

[56] References Cited

U.S. PATENT DOCUMENTS

| | | | |
|---|---|---|---|
| 2,421,764 | 6/1947 | Swallow | 156/230 |
| 2,711,985 | 6/1955 | Olson | 156/287 |
| 2,724,672 | 11/1955 | Rubin | 156/294 |
| 2,941,570 | 6/1960 | Plym | 156/213 |
| 3,513,051 | 5/1970 | Lichfield | 156/249 |
| 3,513,430 | 5/1970 | Heller | 338/4 |
| 4,169,749 | 10/1979 | Clark | 156/293 |
| 4,318,936 | 3/1982 | Moss et al. | 338/4 |

OTHER PUBLICATIONS

Moore, Epoxy Transfer and Print Head, p. 15, Western Electric Technical Dig., #50, 4/1978.
Butler et al., A Device for use in Apply Strain Gages to Cylindrical Specimens, Experimental Mechanics, 10/1966.

*Primary Examiner*—Edward C. Kimlin
*Assistant Examiner*—Louis Falasco
*Attorney, Agent, or Firm*—Darrell G. Brekke; John R. Manning; Robert D. Marchant

[57] ABSTRACT

The invention generally relates to methods and devices for installing in a tubular shaft multiple strain gages, and more particularly to a method and a device for pneumatically forcing strain gages into seated engagement with the internal surfaces of a tubular shaft in an installation of multiple strain gages in a tubular shaft. The essence of the invention involves the novel concept of seating strain gages or other electronic devices in a template-like component, wrapping the template-like component about a pneumatically expansible body, inserting the component into a shaft and expanding the body pneumatically, a suitable adhesive having been applied to the surfaces.

9 Claims, 5 Drawing Figures

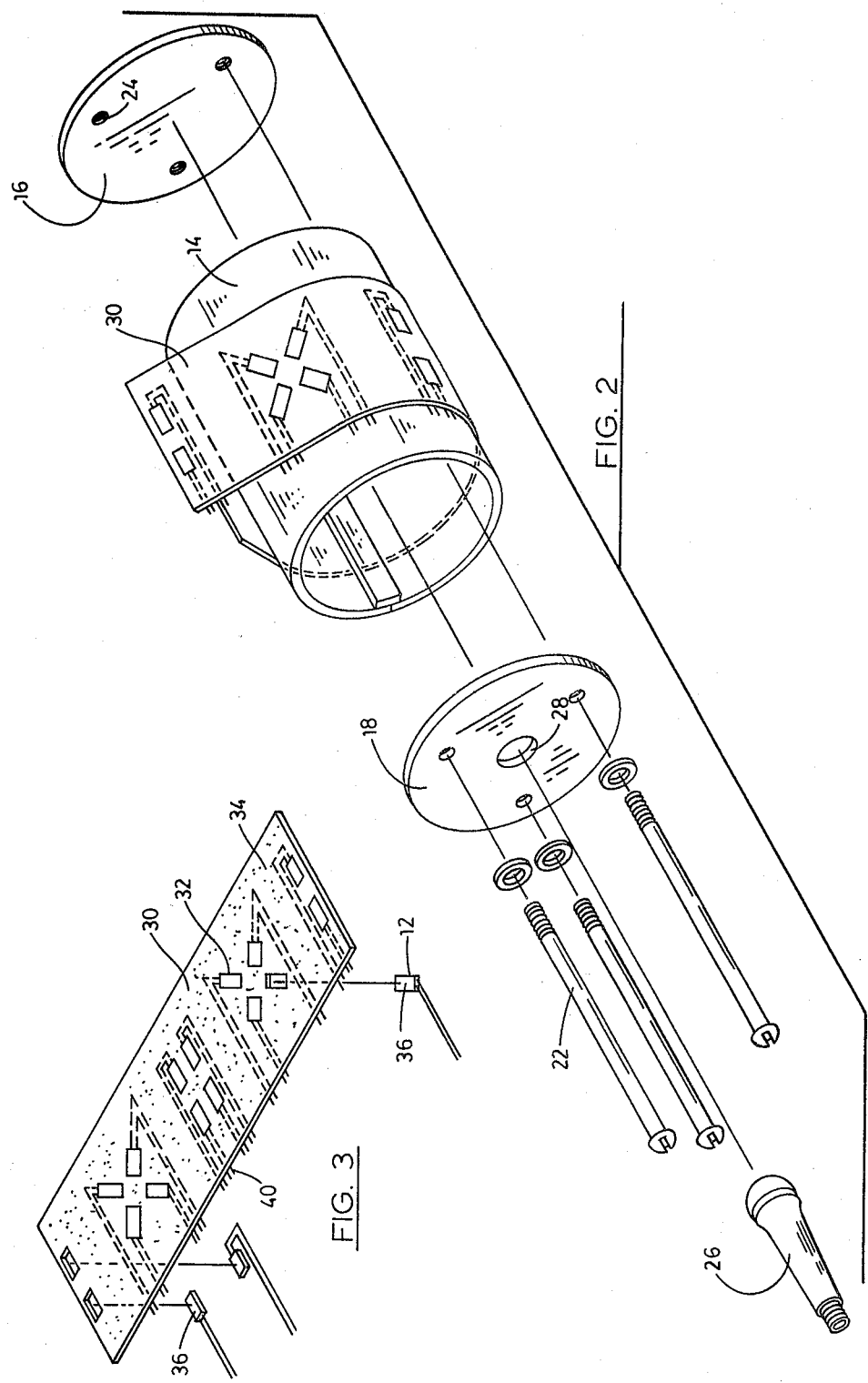

U.S. Patent  Oct. 4, 1983  Sheet 3 of 3  4,407,686
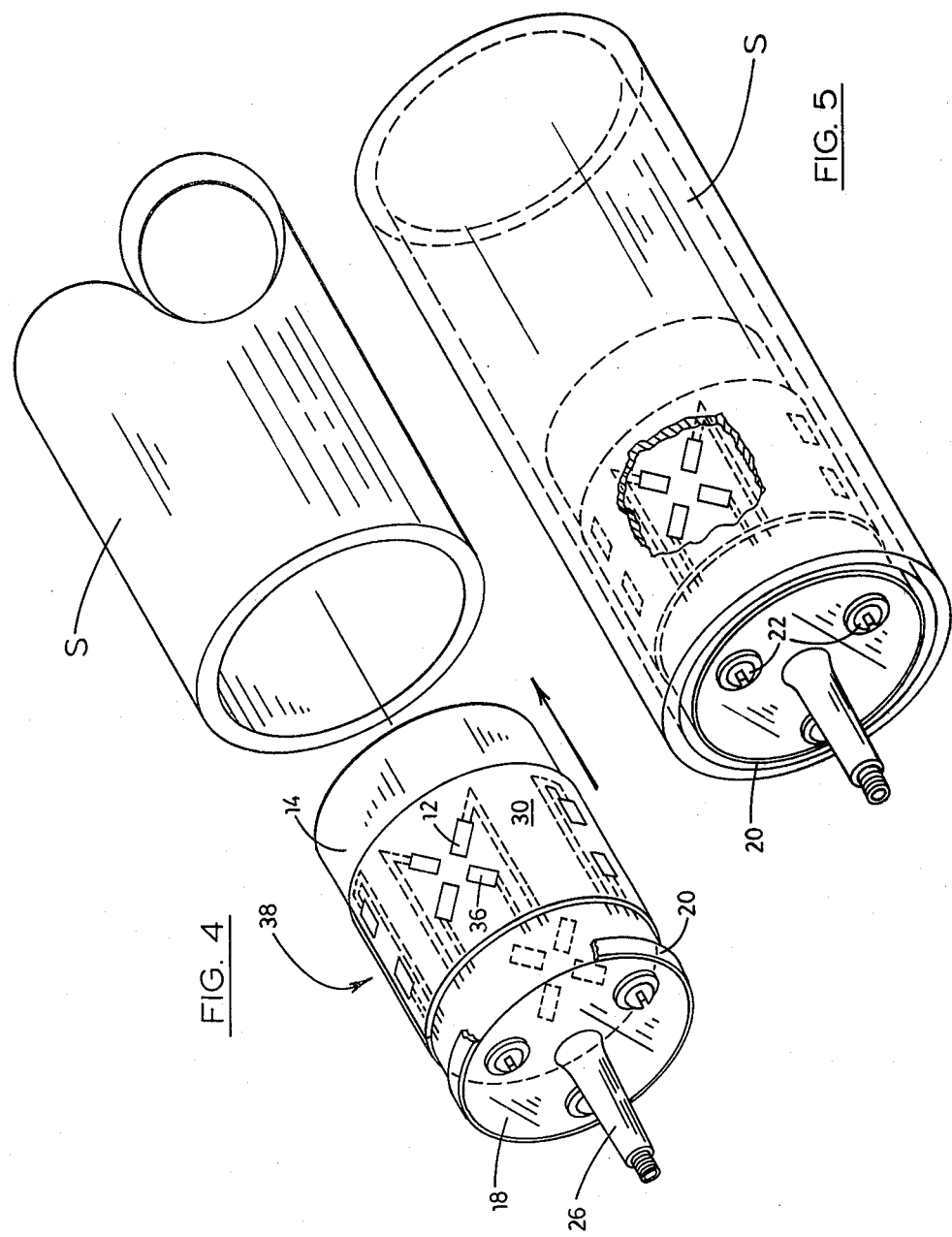

INFLATABLE DEVICE FOR INSTALLING STRAIN GAGE BRIDGES

ORIGIN OF THE INVENTION

The invention described herein was made in the performance of work by employees of the U.S. Government and may be manufactured and used by or for the Government for Governmental purposes without the payment of any royalties thereon or therefor.

BACKGROUND OF THE INVENTION 1. Field of the Invention

The invention generally relates to methods and devices for installing in a tubular shaft multiple strain gages, and more particularly to a method and a device for pneumatically forcing strain gages into seated engagement with the internal surfaces of a tubular shaft in an installation of multiple strain gages in a tubular shaft. The essence of the invention involves the novel concept of seating strain gages or other electronic devices in a template-like component, wrapping the template-like component about a pneumatically expansible body, inserting the component into a shaft and expanding the body pneumatically, a suitable adhesive having been applied to the surfaces.

2. Description of the Prior Art

Heretofore, mechanical devices have been constructed for use in installing strain gages in tubular shafts such as the torsion shaft for the canard of F-16 aircraft.

Unfortunately, mechanical devices heretofore employed have not satisfactorily served their intended purposes. For example, installed strain gages, installed utilizing the mechanical prior art devices, frequently undergo displacement or dislodgement, further, the strain gages are often lost. Also, the number of strain gages that can be installed at one time is minimal, and an inordinate amount of time is involved in the attachment of the gages when utilizing the mechanical devices and methods of the prior art. As a consequence, it is generally accepted that installation of strain gages in tubular shafts is a difficult task requiring an inordinate amount of time, and is normally attended by some degree of inaccuracy.

As a consequence of the aforementioned inadequacies of the methods and devices of the prior art, it should be apparent that there currently exists a need for a simplified method and apparatus which can readily be employed in rapidly and accurately mounting strain gages in tubular shafts without the disadvantages which attend the methods and devices previously employed for such purposes.

During the course of a preliminary search conducted for the instant invention, certain patents were discovered which are believed to be pertinent, but fail to teach the instant invention. These patents are listed on the enclosed Form PTO-1449.

While the patents discovered during the course of the search indicate that pneumatically expansible devices heretofore have been employed in joining various materials to the internal surfaces of a tubular body, none of the references discovered in the course of the search contain any suggestion of a method and a device which employs an expansible body for forcing into engagement with the internal surfaces of a tubular shaft, a template-like component having seated therein strain gages to be affixed to the internal surfaces of the shaft.

It is therefore believed that the references discovered in the course of the search clearly fail to disclose the invention hereinafter more fully described and claimed.

It is, therefore, the general purpose of the instant invention to provide a practical and economical method and device which can readily be employed in expeditiously and accurately mounting strain gages at desired locations on the internal surfaces of tubular shafts and the like, such as the torsion shaft for the canard of F-16 aircraft.

OBJECTS AND SUMMARY OF THE INVENTION

It is an object of the instant invention to provide a practical and economic method and device for mounting electronic devices internally of tubular shafts.

It is another object to provide a practical and economic method and device which facilitates an expeditious mounting of multiple strain gages at desired locations on the internal surfaces of a tubular shaft.

It is another object of the instant invention to provide a simplified and economical device which readily is employable in the mounting of electronic devices including strain gages on the internal surfaces of tubular bodies such as small diameter shafts and the like.

It is another object to provide a practical and economic pneumatic device having a capability for accurately positioning and simultaneously mounting a plurality of strain gages at desired locations on the internal surfaces of tubular shafts and the like.

These and other objects and advantages are achieved through the use of the device which includes an expansible cylinder having an outside diameter slightly less than the inside diameter of a tubular shaft, the internal surfaces of which multiple electronic devices, such as strain gages, are to be mounted, a flexible, template-like component for mounting the strain gages on the external surfaces of the cylinder, plates for closing the opposite ends of the expansible cylinder, at least one plate having provided therein a pneumatic valve through which the cylinder is pneumatically pressurized and expanded for forcing the template-like device and electronic device into bonding engagement with the internal surfaces of the tubular shaft, as will hereinafter become more readily apparent by reference to the following description and claims in light of the accompanying drawings.

DESCRIPTION OF THE DRAWINGS

FIG. 2 is an exploded perspective view depicting the device employed in mounting the strain gages shown in FIG. 1.

FIG. 3 is a perspective view of a template-like component having openings into which strain gages are inserted preparatory to being wrapped about an expansible body of the device, illustrated in FIG. 2, for thus forming an insertion assembly.

FIG. 4 is a perspective view illustrating an insertion assembly just prior to its insertion into a tubular shaft.

FIG. 5 is a perspective view depicting the insertion assembly in position for initiating the mounting of a plurality of strain gages on the internal surfaces of the hollow shaft shown in FIG. 4 through a pneumatic expansion of the expansible body.

DESCRIPTION OF THE PREFERRED EMBODIMENT

Figure 1:
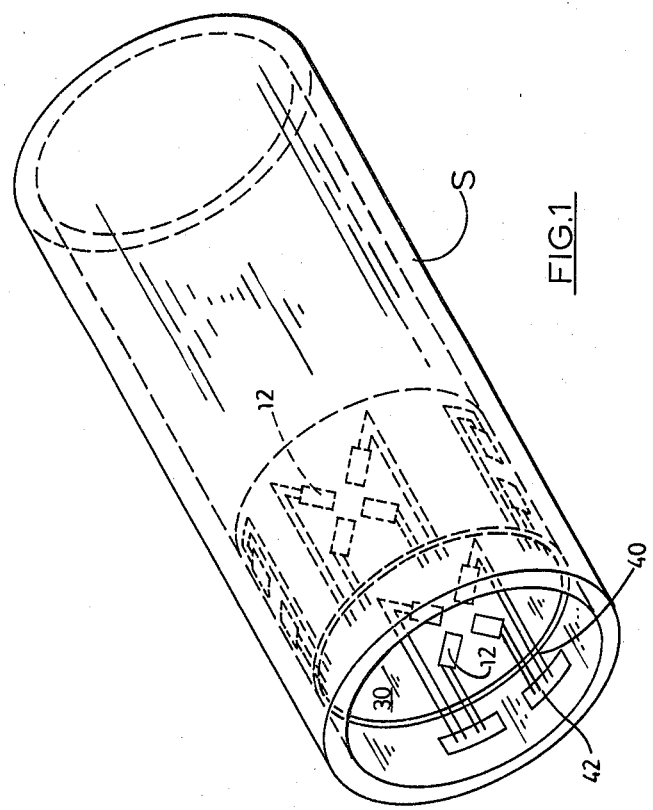
FIG. 1 is a perspective view of a portion of a tubular shaft having mounted therein a plurality of strain gages, said strain gages being mounted in accordance with the principles of the instant invention.

Referring now to the drawings, with more particularity, wherein like reference characters designate like or corresponding parts throughout the several views, there is shown in FIG. 1 a length of a tubular shaft, generally designated S, having mounted therein a plurality of strain gages 12, said strain gages being mounted in accordance with the principles of the instant invention.

As shown in FIG. 2, the device includes an expansible cylinder 14, also herein referred to as a body, formed from a fiberglass, impregnated silicon rubber, approximately 1/16-inch in thickness, marketed by General Electric under the designation RTV-159 rubber. The expansible cylinder 14 is closed at each of its opposite ends by a metallic plate, designated 16 and 18. The plates 16 and 18 are adhesively sealed to the ends of the cylinder 14 utilizing suitable adhesive materials, such as the material known on the market as M-Bond 610.

The plates 16 and 18 also are coupled together through the use of a plurality of tie-bolts 22 which extend through bores formed in the plate 18 and received in internally threaded bores 24, FIG. 2, formed in the plate 16. The tie bolts 22 serve to prevent the ends of the cylinder 14 from undergoing axial expansion as the tube 14 is pneumatically pressurized. While not in all instances necessary, it is often preferred to utilize a length of tape, designated 20, FIG. 4, for completing the seal of the plate 18 to the expansible cylinder 14 and for further assuring that the expansible cylinder 14 does not separate from the plate 18 during expansion thereof. Preferably, the tape is employed in connecting both the plates 16 and 18 with the cylinder 14.

Pressurization of the expansible cylinder 14 is facilitated through the use of a conventional valving assembly, designated 26, seated in the bore 28 concentrically related to the plate 18. While the valve 26 is of any suitable design, it may be of a type commonly employed in facilitating pressurization of aircraft tires and the like.

At this juncture, it should readily be apparent that the expansible cylinder or body 14 is adapted to be pressurized via the valve assembly 26. Pressurization of the expansible cylinder 14 is attended by radial expansion thereof. In practice, the cylinder 14 is pressurized to 30 psi.

Referring for a moment to FIG. 3, there is shown a flexible, template-like component 30 having openings 32 for receiving strain gages 12, or other electronic devices. The component 30 is formed from 5 Mil. Teflon with the openings 32 being formed of a suitable configuration to receive the strain gages and are located at suitable locations, determined by the directions of the forces to be measured in the tubular shaft S. It is noted that the component 30 includes a surface 34 suitably etched to enhance a bonding engagement thereof to the internal surfaces of the shaft S.

The strain gages 12 are of any desired design, however, each of the strain gages 12 includes a base or mounting surface, designated 36, which serves to facilitate a mounting of the strain gage to the internal surface of the shaft S. An insertion assembly 38, FIG. 4, is formed by first positioning the strain gages 12 in the openings 32 with the mounting surfaces 36 of the strain gages being accessible from the etched surface 34 of the template-like component 30.

Where desired, a layer of tape may be employed in securing the strain gages in place in the component 30. However, in practice, the strain gages 12 are provided with electrical leads 40 which extend along the surface of the component 30, opposite the etched surface 34 and renders support to the strain gages as they rest in the openings 32. The template 30 is now wrapped about the central portion of the expansible cylinder 14, as generally indicated in FIG. 2. Subsequent to a wrapping of the template 30 about the cylinder 14 an adhesive material such as M-Bond 610, high micromeasurement adhesive is applied to the etched surface 34 of the template 30 as well as the exposed surfaces 36 of the strain gages 12. Thus the insertion assembly 38 is formed, as illustrated in FIG. 4, and readied for insertion.

The insertion assembly 38 has an outside diameter of approximately 1/16 of an inch smaller than the internal diameter of the shaft S which facilitates insertion of the assembly 38 to a desired depth within the shaft S. A pneumatic connection is now made between the expansible cylinder 14 and a source of pneumatic pressure, not shown, through a suitable conduit connected with the valve assembly 36 in a conventional manner. The expansible cylinder 14 is now pressurized to approximately 30 psi for forcing the etched surface of the template 30 and the exposed surfaces 36 of the strain gages into engagement with the internal surfaces of the shaft S.

The pressure thus established within the cylinder 14 is maintained for a period sufficient for the adhesive to cure. Thereafter, the pressure is released from the cylinder 14, via the valve assembly, for thus permitting a depressurization of the expansible cylinder with an attendant reduction in the diameter of the cylinder. The cylinder 14 is now axially removed from the interior of the shaft S leaving the component 30 attached to the internal surface of the shaft, along with the strain gages 12 seated in the openings 32. Electrical leads 40 are now connected with terminal boards 42, FIG. 1, which, as desired, also may be adhesively attached to the internal surface of the shaft S. However, the terminal boards 42 may be located at any desired location.

In view of the foregoing, it is believed that the instant invention provides a practical and economic method and device for readily attaching strain gages and similar electronic devices to the internal surfaces of tubular shafts in a manner which facilitates rapid and economic fabrication of devices which normally require the attachment of strain gages internally of tubular shafts.

What is claimed is:

1. In a method for installing in a tubular shaft, multiple electronic devices, such as strain gages, having bonding surfaces and leads extended therefrom, the steps comprising:

A. forming a flexible, template-like component from a thin sheet of Teflon, said template being provided with multiple openings for receiving said electronic devices and characterized by an etched bonding surface;

B. inserting electronic devices into the openings provided for said component with the bonding surfaces of the electronic devices being exposed at the etched surface of the template-like component, and the leads of the electronic devices being extended along the surface of the component opposite the etched surface thereof;

C. wrapping the component around an expansible cylinder with the etched surface of the template facing away from the cylinder thus to form an insertion assembly;

D. coating with adhesive the etched surface of the template and mounting surfaces of the electronic devices;

E. inserting the assembly to a desired depth within the tubular shaft; and

F. expanding the cylinder for forcing the surfaces of the template-like component and the surfaces of the electronic devices to which the adhesive has been applied into bonding contact with the adjacent surface of the shaft for thus bonding the component and electronic devices to the shaft.

2. In a method as defined in claim 1 wherein said expansible cylinder comprises a tube formed of silicon rubber sealed at each of its opposite ends by a rigid plate, the plate at one end of the tube being provided with a pneumatic valve for use in pressurizing the cylinder and said step of expanding the cylinder includes the step of pneumatically pressurizing the cylinder.

3. In a method as defined in claim 1 further including the step of bonding the leads to terminal boards mounted in said tubular shaft.

4. In a method as defined in claim 2 further including the steps of permitting the adhesive to cure, depressurizing the cylinder and removing the cylinder from the shaft, leaving said template-like component and electronic devices bonded to the internal surface of the tubular shaft.

5. In a method as defined in claim 5 wherein said cylinder is pressurized to 30 psi, the template-like component is formed from a sheet of .5 Mil. Teflon, and the plate at one end of the tube is connected to the plate at the other end thereof by a plurality of tie-bolts which serve to preclude axial separation of the plates as the cylinder is expanded.

6. In a device for use in installing in a tubular shaft, multiple electronic devices such as strain gages and the like having electrical leads extending therefrom, the improvement comprising:

A. means comprising an expansible cylinder having an outside diameter slightly less than the inside diameter of said tubular shaft;

B. a flexible template-like component with openings having strain gages secured therein, said component and said strain gages having a surface adapted to be supported by the external surface of said cylinder and an opposite bonding surface coated with an adhesive;

C. means for sealing the opposite ends of said expansible cylinder including a pair of rigid plates adhesively secured to said cylinder at the opposite ends thereof and means interconnecting the plates for preventing axial separation thereof; and D. means for expanding said cylinder so as to bond said component and strain gages to said inside of said tubular shaft.

7. An improvement as defined in claim 6 wherein said expansible cylinder is made of silicon rubber, said template-like component is formed of 5 Mil. bondable Teflon, said plates comprise aluminum disks, and said means for preventing axial separation of the plates includes tie-bolts extended between and connected to said plate.

8. An improvement as defined in claim 6 wherein said means for expanding said cylinder includes a pneumatic valve coupled with one plate of said pair of plates.

9. A device particularly suited for use in installing strain gages internally of a tubular load bearing shaft, comprising:

A. an expansible cylinder formed of silicon rubber, said cylinder being characterized by an outside diameter less than the internal diameter of said shaft;

B. means for pneumatically sealing each of the opposite ends of said expansible cylinder including a pair of metallic plates adhesively secured to the cylinder and interconnected by a plurality of rigid tie-bolts, at least one of said plates being provided with a pneumatic valve for accommodating a pneumatic pressurization and depressurization of said cylinder;

C. a flexible template-like component for mounting strain gages on the external surface of said cylinder, said component formed of bondable Teflon and including a bonding surface engagable with the internal surface of said shaft and a plurality of openings defined in the template, strain gages secured in said openings in a manner such that a mounting surface for each strain gage protrudes through one of said openings formed in the component; and D. means comprising an adhesive for uniting the bonding surface of the component and the mounting surface of each strain gage to the internal surface of said shaft in response to a pressurization of the cylinder.

* * * * *